United States Patent
Walker et al.

(10) Patent No.: US 11,576,515 B2
(45) Date of Patent: Feb. 14, 2023

(54) APPARATUS FOR HEATING A POT OF FOOD OR BEVERAGE

(71) Applicant: Equip Line Limited, Uxbridge (GB)

(72) Inventors: Jacki Walker, Uxbridge (GB); Jason Krebs, High Wycombe (GB); Robert Morgan, Northolt (GB); Harvey Tuck, Uxbridge (GB)

(*) Notice: Subject to any disclaimer, the term of this patent is extended or adjusted under 35 U.S.C. 154(b) by 0 days.

(21) Appl. No.: 16/986,562

(22) Filed: Aug. 6, 2020

(65) Prior Publication Data

US 2021/0289976 A1 Sep. 23, 2021

(30) Foreign Application Priority Data

Mar. 23, 2020 (GB) .................................... 2004180

(51) Int. Cl.
*A47J 27/14* (2006.01)
*A47J 27/00* (2006.01)
(Continued)

(52) U.S. Cl.
CPC ............. *A47J 27/14* (2013.01); *A47J 27/004* (2013.01); *A47J 36/32* (2013.01); *H05B 1/0261* (2013.01);
(Continued)

(58) Field of Classification Search
CPC .......... A47J 27/14; A47J 27/004; A47J 36/32; A47J 36/26; A47J 36/2483; H05B 1/0261;
(Continued)

(56) References Cited

U.S. PATENT DOCUMENTS 3,328,561 A * 6/1967 Sakamoto ............. A47J 27/004
219/442
3,578,951 A * 5/1971 Ingrao .................... H05B 3/681
219/448.16
(Continued)

FOREIGN PATENT DOCUMENTS

JP 2001131513 6/2001
JP 2001161513 6/2001
(Continued)

OTHER PUBLICATIONS

PCT/GB2021/050645—Written Opinion of the International Searching Authority.
(Continued)

*Primary Examiner* — Eric S Stapleton
(74) *Attorney, Agent, or Firm* — Landmark Intellectual Property Law, LLC; Gregory Murphy

(57) ABSTRACT

There is provided an apparatus for heating a pot of food or beverage, the apparatus comprising at least one receptacle (20), each receptacle for temporarily receiving a pot of food or beverage to be heated. Each receptacle comprises a base (22), sidewalls (24), and an opening opposite from the base (22) for receiving the pot; a heater element (43) mounted to the sidewalls; a temperature sensor (45) mounted to the base; a pot sensor (40, 41) for detecting whether or not a pot is present in the receptacle; and a controller connected to the heater element, temperature sensor, and pot sensor. The controller is configured to control the heater element in response to the pot sensor and temperature sensor.

19 Claims, 4 Drawing Sheets

(51) Int. Cl.
*A47J 36/32* (2006.01)
*H05B 1/02* (2006.01)
*H05B 3/20* (2006.01)

(52) U.S. Cl.
CPC ........... *H05B 3/20* (2013.01); *H05B 2213/05* (2013.01); *H05B 2213/06* (2013.01)

(58) Field of Classification Search
CPC .................. H05B 3/20; H05B 2213/05; H05B 2213/06
USPC ......................................................... 219/419
See application file for complete search history.

(56) References Cited

U.S. PATENT DOCUMENTS

| | | | | |
|---|---|---|---|---|
| 4,015,084 A * | 3/1977 | Tsumori | ................. | H05B 6/062 219/626 |
| 4,095,076 A * | 6/1978 | Tsumori | ................. | H05B 6/062 219/626 |
| 4,356,371 A * | 10/1982 | Kiuchi | ................... | H05B 6/062 219/626 |
| 4,535,229 A * | 8/1985 | Wolf | ..................... | A47J 36/321 219/440 |
| 4,649,263 A * | 3/1987 | Goodlaxson | ............ | A23L 7/187 219/436 |
| 4,687,910 A * | 8/1987 | Aoshima | ................. | A47J 36/32 219/506 |
| 4,815,431 A * | 3/1989 | Yorita | .................... | F01M 5/021 123/196 AB |
| 4,948,950 A * | 8/1990 | Rae | ...................... | A47J 37/1266 219/497 |
| 5,223,697 A * | 6/1993 | Wilde | ..................... | H05B 3/746 219/447.1 |
| 5,227,610 A * | 7/1993 | Schultheis | ............. | G05D 23/24 219/445.1 |
| 5,228,381 A * | 7/1993 | Virgilio | .................. | A47J 36/165 99/331 |
| 5,296,682 A * | 3/1994 | Wittauer | ................. | H05B 3/746 219/447.1 |
| 5,296,684 A * | 3/1994 | Essig | ..................... | H05B 3/746 219/518 |
| 5,567,458 A * | 10/1996 | Wu | ....................... | A47J 27/004 219/433 |
| 5,893,996 A * | 4/1999 | Gross | ..................... | H05B 3/746 219/447.1 |
| 5,900,175 A * | 5/1999 | Kicherer | ................ | H05B 3/748 219/453.14 |
| 5,951,900 A * | 9/1999 | Smrke | .................... | A47J 36/321 219/497 |
| 6,018,154 A * | 1/2000 | Izaki | ...................... | H02M 7/537 219/625 |
| 6,075,463 A * | 6/2000 | Wauer | .................... | G01K 11/265 219/518 |
| 6,184,501 B1 * | 2/2001 | Zapf | ...................... | H05B 3/746 219/447.1 |
| 6,242,721 B1 * | 6/2001 | Borrmann | ............. | F24C 15/106 219/446.1 |
| 6,259,069 B1 * | 7/2001 | Schotten | ................ | H05B 3/746 219/447.1 |
| 6,274,847 B1 * | 8/2001 | Hlava | .................... | A47J 27/004 219/433 |
| 6,320,169 B1 * | 11/2001 | Clothier | ............. | G06K 19/0723 219/626 |
| 7,009,159 B2 * | 3/2006 | Kataoka | ................ | H05B 6/1263 219/622 |
| 7,173,224 B2 * | 2/2007 | Kataoka | ................ | H05B 6/1263 219/620 |
| 2002/0011480 A1 * | 1/2002 | Schilling | ................ | H05B 3/746 219/448.11 |
| 2002/0027175 A1 * | 3/2002 | Capp | ..................... | A47J 43/046 241/199.12 |
| 2003/0010769 A1 * | 1/2003 | Wilde | .................... | H05B 3/746 219/448.19 |
| 2004/0098888 A1 * | 5/2004 | Ukida | .................... | A47J 27/004 40/299.01 |
| 2004/0144769 A1 * | 7/2004 | Pastore | .................. | H05B 3/746 219/447.1 |
| 2004/0149736 A1 * | 8/2004 | Clothier | ................. | H05B 6/062 219/627 |
| 2005/0115957 A1 * | 6/2005 | Kataoka | ................ | H05B 6/1263 219/620 |
| 2005/0242086 A1 * | 11/2005 | Imura | ................. | G06K 7/10336 219/627 |
| 2006/0081615 A1 * | 4/2006 | Kataoka | ................. | H05B 6/062 219/622 |
| 2006/0091137 A1 * | 5/2006 | McLemore | ........... | G04G 15/003 219/708 |
| 2006/0254429 A1 * | 11/2006 | Sinton | .................... | A47J 36/165 99/348 |
| 2007/0145034 A1 * | 6/2007 | Imura | ...................... | F24C 7/082 219/494 |
| 2007/0170177 A1 * | 7/2007 | Avendano | .............. | H05B 6/129 219/679 |
| 2007/0263699 A1 * | 11/2007 | Clothier | ................ | H05B 6/062 374/163 |
| 2008/0047948 A1 * | 2/2008 | Rosenbloom | ........... | A47J 36/26 219/386 |
| 2008/0314258 A1 * | 12/2008 | Martin | .................... | A47J 29/02 99/329 R |
| 2010/0000980 A1 * | 1/2010 | Popescu | .................. | A47J 36/32 219/201 |
| 2010/0114339 A1 * | 5/2010 | Kaiser | .................... | H05B 3/746 700/90 |
| 2010/0170892 A1 * | 7/2010 | Wilson | ................... | H05B 6/108 219/621 |
| 2011/0003048 A1 * | 1/2011 | Sugimoto | ............. | A47J 27/086 426/509 |
| 2011/0011850 A1 * | 1/2011 | Rosenbloom | ........... | A47J 36/26 219/622 |
| 2012/0321760 A1 * | 12/2012 | Xie | ........................ | A47J 36/321 426/231 |
| 2013/0036917 A1 * | 2/2013 | Berge | .................... | A47J 27/004 99/344 |
| 2013/0084369 A1 * | 4/2013 | Smrke | ............. | G05D 23/27535 426/231 |
| 2013/0264333 A1 * | 10/2013 | Alipour | ................ | A47J 27/004 219/621 |
| 2014/0305928 A1 * | 10/2014 | Thompson | ............... | H05B 3/74 219/448.12 |
| 2014/0353316 A1 * | 12/2014 | Lin | ........................ | A47J 36/08 220/573.1 |
| 2015/0000534 A1 * | 1/2015 | Hager | .................... | A23L 21/10 99/328 |
| 2015/0068409 A1 * | 3/2015 | Tanaka | ................... | A47J 27/004 99/348 |
| 2015/0147441 A1 * | 5/2015 | Lagerlof | ................ | A47J 36/321 426/231 |
| 2015/0157161 A1 * | 6/2015 | Lagerlof | ................ | F24C 7/083 99/332 |
| 2015/0312969 A1 * | 10/2015 | Hazir | ..................... | A47J 43/082 219/621 |
| 2016/0007644 A1 * | 1/2016 | Hack | ...................... | A23L 3/003 99/333 |
| 2016/0150915 A1 * | 6/2016 | Yu | ......................... | A47J 43/046 99/327 |
| 2016/0198883 A1 * | 7/2016 | Wang | .................... | A47J 36/321 426/231 |
| 2016/0227609 A1 * | 8/2016 | Taplan | ..................... | H05B 3/74 |
| 2016/0302263 A1 * | 10/2016 | Goetze | .................. | H05B 6/062 |
| 2016/0367061 A1 * | 12/2016 | Chou | ................... | A47J 36/2483 |
| 2016/0367073 A1 * | 12/2016 | Smith | ..................... | A47J 36/34 |
| 2017/0086258 A1 * | 3/2017 | Burkhardt | ............. | A47J 36/32 |
| 2017/0205077 A1 * | 7/2017 | Seo | ........................ | F24C 7/087 |
| 2017/0219215 A1 * | 8/2017 | Hui | ........................ | F24C 7/083 |
| 2017/0245327 A1 * | 8/2017 | Viroli | .................... | H05B 6/062 |
| 2017/0245681 A1 * | 8/2017 | Huang | .................... | A47J 27/092 |
| 2017/0367515 A1 * | 12/2017 | Cornelissen | ........... | A47J 27/004 |

(56) References Cited

U.S. PATENT DOCUMENTS

| | | | |
|---|---|---|---|
| 2018/0070756 A1* | 3/2018 | Vengroff | A47J 36/321 |
| 2018/0249536 A1* | 8/2018 | Heczko | H05B 6/06 |
| 2018/0259190 A1* | 9/2018 | Furuti | F24C 15/10 |
| 2018/0271322 A1* | 9/2018 | Thai | A47J 43/0716 |
| 2018/0317691 A1* | 11/2018 | Huang | A23L 5/17 |
| 2018/0317692 A1* | 11/2018 | Huang | A47J 36/32 |
| 2018/0317693 A1* | 11/2018 | Huang | A47J 27/086 |
| 2018/0333006 A1* | 11/2018 | Bassill | A47J 36/32 |
| 2018/0349200 A1* | 12/2018 | Blasco Rueda | H04L 41/0893 |
| 2019/0075956 A1* | 3/2019 | Bang | A47J 27/004 |
| 2019/0099035 A1* | 4/2019 | Trice | A47J 36/32 |
| 2019/0125120 A1* | 5/2019 | Jenkins | A47J 36/321 |
| 2019/0142027 A1* | 5/2019 | Stolze | A23G 1/18 99/483 |
| 2019/0166657 A1* | 5/2019 | Benz | H05B 6/1218 |
| 2019/0174962 A1* | 6/2019 | Mosebach | A47J 43/0722 |
| 2019/0208946 A1* | 7/2019 | Eades | A47J 27/004 |
| 2019/0298100 A1* | 10/2019 | Li | A47J 36/32 |
| 2019/0329419 A1* | 10/2019 | Farid | B25J 11/0045 |
| 2019/0365148 A1* | 12/2019 | Gabriel | A47J 27/004 |

FOREIGN PATENT DOCUMENTS

| | | |
|---|---|---|
| JP | 2016101215 | 6/2016 |
| WO | 2015130769 | 9/2015 |

OTHER PUBLICATIONS

Combined Search and Examination Repor Under Section 17 and 18(3), For Application GB2004180.2, Great Britain Intellectual Property Office.

\* cited by examiner

APPARATUS FOR HEATING A POT OF FOOD OR BEVERAGE

RELATED APPLICATIONS

This application claims priority to, and the benefit of, United Kingdom Patent Application No. GB2004180.2, filed on 23 Mar. 2020, which is incorporated by reference in its entirety.

FIELD OF THE INVENTION

The present invention relates to an apparatus for heating a pot of food or beverage, and more specifically to an apparatus comprising a receptacle for receiving the pot and heating it.

BACKGROUND OF THE INVENTION

In the catering industry there is often a need to keep food and/or beverages hot so that they are ready for sale to customers when required. Various devices are known in the art for keeping food or beverages hot, such as hot plates, chafing dishes, soup kettles, grab & go units, etc.

One of the problems with known devices is the large amount of energy that they normally require to keep the food or beverage hot. A known technique uses blown hot air to circulate around pots of food or beverages, but this is noisy and wasteful since a proportion of the hot air is lost to the surrounding environment, and there is typically only one global temperature setting that applies to the whole device regardless of how many, or how few, pots are in the unit.

Food and/or beverage may be kept hot more efficiently if it is stored in bulk, but this does not allow for easy dispense to consumers who each require only a small quantity. Further, if only a small quantity is ultimately sold keeping a large quantity of food or beverage hot increases food waste.

Food laws typically set minimum temperatures and/or maximum durations of time at which food can be stored in a hot state.

It is therefore an object of the invention to provide an improved apparatus for heating a pot of food or beverage.

SUMMARY OF THE INVENTION

According to the invention, there is provided an apparatus for heating pots of food or beverage, the apparatus comprising at least one receptacle, each receptacle for temporarily receiving a pot of food or beverage to be heated, wherein the receptacle comprises: a base, sidewalls, and an opening opposite from the base for receiving the pot; a heater element mounted to the sidewalls; a temperature sensor mounted to the base; a pot sensor for detecting whether or not a pot is present in the receptacle; and a controller connected to the heater element, temperature sensor, and pot sensor, the controller configured to control the heater element in response to the pot sensor and temperature sensor.

By mounting the pot into a receptacle, the heat energy generated at the receptacle can be efficiently passed to the pot, heating the pot contents. The temperature sensor is mounted to the base of the receptacle so that it is largely unaffected by heat emitted from the heater element at the sidewalls, and can more accurately measure the temperature of the pot contents. The heat that is generated by the receptacle and passed to the pot may raise the temperature of the pot up to a desired temperature, or the heat may simply maintain the temperature of a pot that is already at the desired temperature when the pot is first placed into the receptacle.

In use, the controller may turn the heater element on when the pot sensor indicates a pot is present in the receptacle and turn the heater element off once the temperature sensor indicates the required temperature has been reached. Once the temperature falls below a pre-set level, the controller turns the heater element on again. The placement of the heater element at the sidewalls and the temperature sensor at the base so they are physically remote from one another helps prevent rapid on-off cycling of the heater element. The controller may be configured to turn the heater element off once the pot sensor indicates the pot has been withdrawn from the receptacle, regardless of the temperature measured by the temperature sensor.

The controller may be configured to only turn the heater element on after the pot sensor has continually indicated the presence of a pot for a threshold period of time of at least one second. Then, the heater element will not be turned on the instant that the pot is placed in the receptacle, so that if pots are quickly lifted in and out of the receptacle energy will not be wasted. The controller may be programmable to allow the threshold period of time to be increased according to user requirements, for example three seconds, or even longer.

The controller may be configured to keep the heater element turned off if the pot sensor indicates a pot is present when the controller is initially turned on, until after the controller has recorded an indication from the pot sensor that no pot is present. Then, when the system is first turned on at the beginning of the day, it will not waste energy heating up pots that were accidently left in the receptacles at the end of the previous day. In addition, if a malfunction occurs in the pot sensor which causes the pot sensor to continually report that a pot is present even when one is not, then when the controller is turned on the heater element will remain off, rather than turning on when no pot is present.

The receptacle may comprise a metal cup that forms inside surfaces of the receptacle for touching the pot, the metal cup forming the base, sidewalls, and opening of the receptacle. The metal allows heat to be efficiently transferred from the heater element to the pot, and is easy to clean in the event of product spillages. The metal cup may also be electrically connected to ground to ensure the electrical safety of the receptacle. Preferably, the metal is aluminium to provide high conductivity of heat from the heater element to the pot.

The receptacle may comprise a layer of thermal insulation wrapped around the sidewalls of the receptacle, the heater element being positioned between the sidewalls and the layer of thermal insulation. Then, the heat is constrained to the receptacle and the pot, and energy efficiency is maximised. The thermal insulation may for example be a ceramic fibre material.

The heater element may be a heater mat that extends over at least 30% of the area of the sidewalls. Then, the receptacle heats the pot evenly, and the temperature of the heater mat does not need to be driven as high to transfer sufficient heat to the pot, reducing heat losses and improving efficiency. More preferably, the heater mat extends over at least 50% of the area of the sidewalls. The sidewalls may define a cylindrical shape, and the cylindrical shape may have a diameter that tapers along its length, in the manner of a conical shape so that the interior of the receptacle where the pot is received is wider at its top than at its base. The cylindrical shape has a circular cross-section, but the sidewalls may alternatively be shaped to define other cross-sections such as square or rectangular cross sections, again optionally tapered in width along their length. Preferably, the heater element is an electrical resistance heater element, and so it can be easily controlled by the controller.

The base and sidewalls define a pot receiving space for receiving the pot, and preferably the pot sensor is recessed into the base or sidewalls, and so does not protrude into the pot receiving space. Then, the pot will not catch against the pot sensor when the pot is placed into the receptacle. The pot sensor may for example comprise an infra-red sensor or a pressure sensor.

The controller preferably comprises a mains voltage heater element switch and a lower voltage control section for controlling the mains voltage heater element switch in response to the pot sensor and temperature sensor. The heater element may be configured to run at mains voltage, and the pot sensor and temperature sensor may be configured to run at lower voltage. By running the heater element at mains voltage, the heater element can produce a large amount of heat to quickly heat up the contents of the pot, and the lower voltage control section of the controller and lower voltage pot sensor and temperature sensor help improve electrical safety and reduce energy consumption.

The apparatus may comprise at least four of the receptacles, wherein the controller is configured to control each receptacle separately from the other receptacles. Then, the temperature of each pot can be set differently to the other pots, and if any one of the receptacles develops a fault, the other receptacles can continue operating. The controller may be switchable to disable operation of each receptacle separately from the other receptacles, so that a receptacle that develops a fault can be disabled. The four receptacles may be mounted in a common housing to one another, for example in a row, along with the controller. In one embodiment, three rows of four receptacles are provided in a common housing, along with three of the controllers, one controller for each row.

The housing may comprise a platform for supporting the at least one receptacles, wherein the platform comprises at least one hole in which the at least one receptacles are respectively mounted, and wherein each receptacle comprises a flange surrounding the opening of the receptacle for securing the receptacle to the platform. Then, the user is presented with a flat surface with holes at receptacles, which allows for easy cleaning and prevents food or beverages from falling between the receptacles and becoming trapped.

The housing may further comprise a cover plate having apertures that align with the openings of the at least one receptacle, wherein the flange of each receptacle is positioned between the platform and the cover plate. The flange may be part of the metal cup, and the cover plate may be formed of a thermally insulative material, for example plastics, to protect the user's fingers from the hot metal flange.

The pot sensor may comprise a colour sensor for sensing a colour of the pot, and the controller may be configured to control the heater element to heat the pot to a temperature that is selected based on the sensed colour of the pot. Accordingly, each pot may comprise a coloured region having a colour corresponding to a temperature to which the food or beverage content of the pot is to be heated to. As well as informing the controller how high a temperature the pot is to be heated up to, the colour also provides a visual indication to the catering staff, so that different coloured pots can be filled with different contents disposable according to the temperature the contents is to be heated up to. For example, some products such as baby milk require heating to 37° C., whereas some products such as soups or stews require heating to at least 65° C.

The controller may be configured to apply different levels of power to the heater element depending on the intended temperature that the pot contents are to be heated to. For example, if the pot contents are only to be heated to 37° C., then a lower level of power may be applied to the heater element to prevent over-heating of the pot's contents. The controller may determine the level of power to be applied to the heater element based upon the colour that is sensed by the pot sensor.

The apparatus may further comprise a plurality of the pots for holding the food or beverage to be heated, wherein each pot is sized to fit closely into the receptacle for effective heat transfer. Preferably, the pots are metal pots to improve heat transfer to the contents of the pots. Each pot may comprise a base having a floor and a rim, the floor defining a bottom of a space inside the pot for receiving food or beverage, and the rim extending downwardly from the floor to create an air gap between the floor and the base of the receptacle when the pot is fitted into the receptacle. The temperature sensor may be located below the air gap, so the air gap provides a buffering function which slows the transfer of heat from the contents of the pot to the temperature sensor. This helps ensure that the whole contents of the pot has been heated up to the required temperature before the temperature sensor causes the controller to turn off the heater element.

The receptacles may be intended to receive pots that each hold a single serving of food or beverage, and so each receptacle may be sized to closely receive a pot of less than 15 cm diameter. Then, only the quantity of food that will be sold is heated up in each receptacle, saving energy.

DESCRIPTION OF THE FIGURES

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. Embodiments of the invention will now be described by way of non-limiting example only and with reference to the accompanying drawings, in which.

Figure 1:
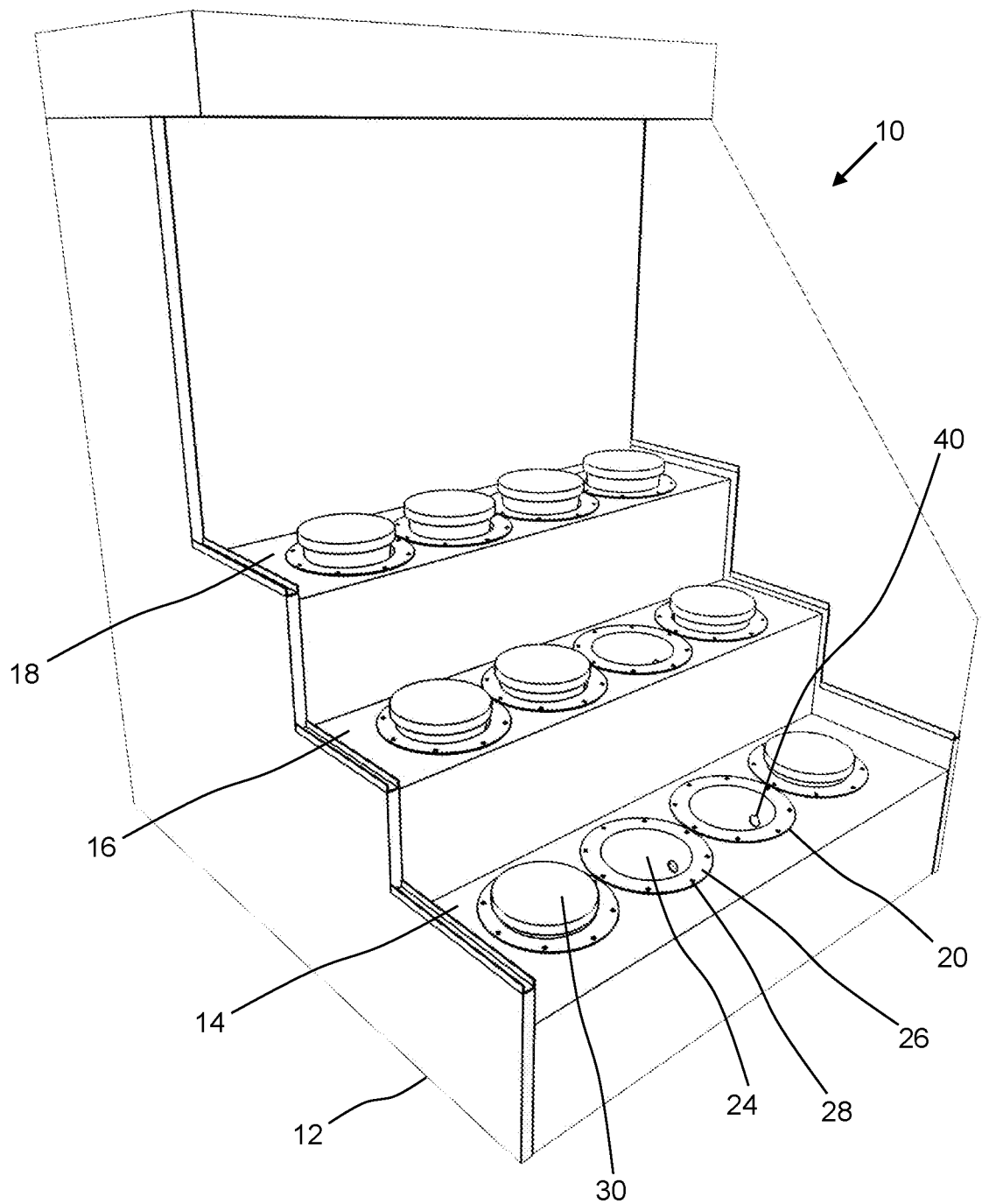
FIG. 1 shows a schematic perspective diagram of a pot heating apparatus according to an embodiment of the invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting. The figures are not to scale, and same or similar reference signs denote same or similar figures.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The schematic diagram of FIG. 1 shows a pot heating apparatus 10, comprising a housing having a base 12 that supports three platforms 14, 16, and 18. Each platform has a row of four holes supporting four receptacles 20 respectively, and so there are twelve receptacles in total. Each receptacle 20 comprises an aluminium cup having sidewalls 24 and a flange 26 around the opening of the receptacle at the top of the sidewalls 24. The flange 26 is fastened to the platform by fasteners 28, retaining the receptacle in the corresponding hole of the platform. Some of the receptacles 20 have pots 30 of food or beverage within them, the receptacles being used to heat the pots.

Optionally, a thermally insulative cover plate (not shown in Figs) may be positioned on top of each platform, the cover plate having apertures that align with the openings of the at least one receptacles. Then, the flange of each receptacle will be positioned between the platform and the cover plate, the cover plate guarding the user's fingers from the flange, which may get hot during use. Alternatively, the flanges of the receptacles may be fastened beneath the platforms instead of on top of them, or the flanges 26 may be formed of a thermally insulative material themselves, and mounted on the sidewalls 24.

It will be appreciated that in alternative embodiments different numbers of receptacles 20 may be provided in different support frameworks from the platforms 14, 16, and 18. The flanges 26 and fasteners 28 provide a convenient means of securing the receptacles to the platforms, but alternative means could be used instead. In this embodiment, the sidewalls and a base of each receptacle 20 are defined by a cylindrical shaped aluminium cup which tapers in width from its top down to its bottom, but other materials and shapes of receptacle could alternatively be implemented.

Figure 2:
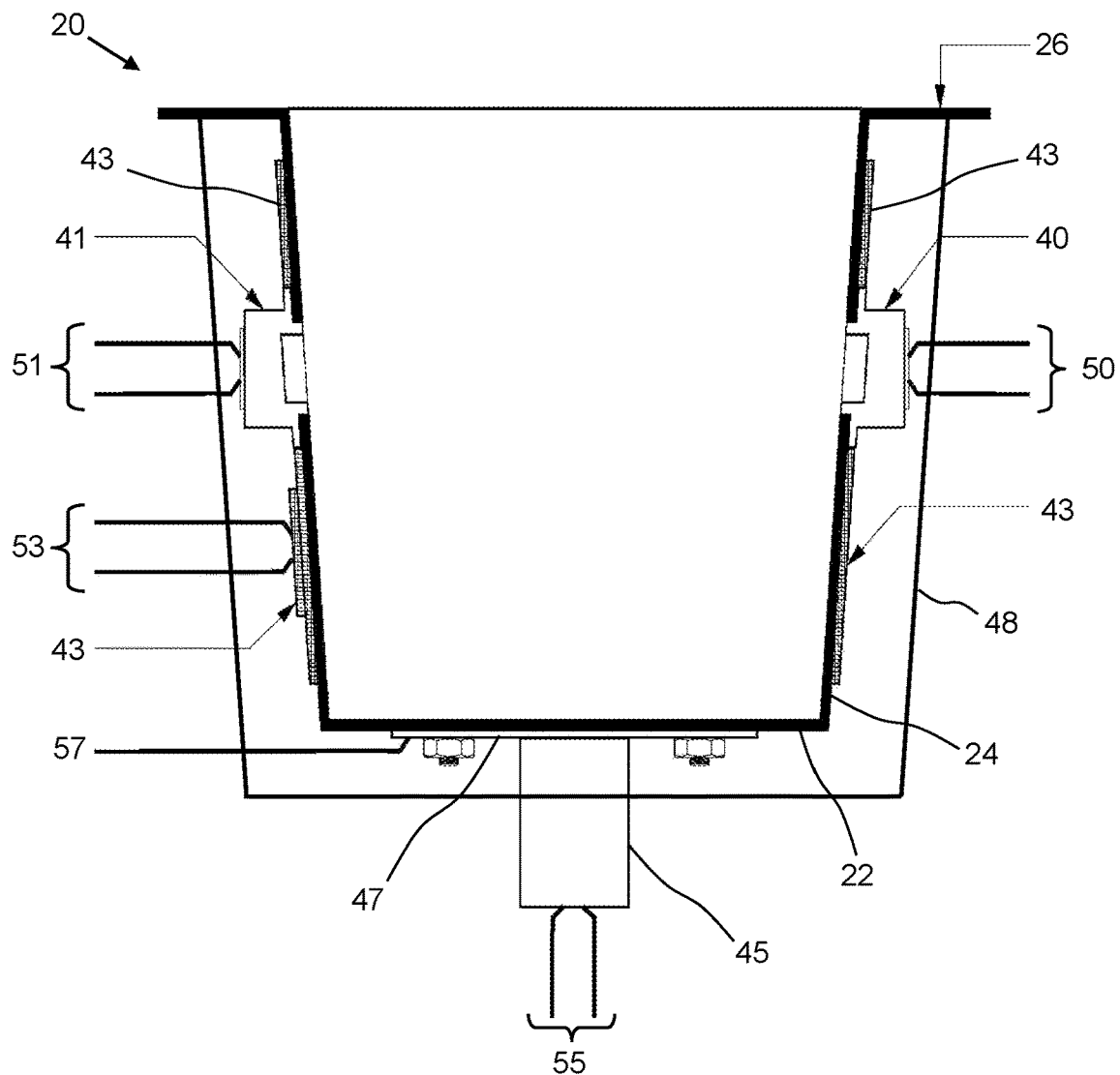
FIG. 2 shows a schematic cross-sectional diagram of a receptacle forming part of the pot heating apparatus of FIG. 1.

The schematic diagram of FIG. 2 shows a cross-sectional view of one of the receptacles 20, separately from the platform hole that it is supported within. The aluminium cup of the receptacle 20 comprises the flange 26, the sidewalls 24, and the base 22 at an opposite end of the sidewalls from the flange 26. The base 22 is in the shape of a disk that closes off the end of the aluminium cup.

The receptacle further comprises a pot sensor in the form of an infra-red (IR) transmitter 40 and IR receiver 41. The IR transmitter and receiver are mounted at opposite sides of the sidewalls 24 from one another, and face towards one another, so that when a pot is placed in the aluminium cup the IR from the transmitter no longer reaches the receiver. The IR transmitter and receiver are connected to wires 50 and 51 (also see FIG. 4), allowing the presence or absence of a pot in the receptacle to be detected. The transmitter 40 and receiver 41 are recessed into the sidewalls 24 so that they do not protrude any further into the receptacle than the sidewalls and will not catch on any pots being inserted/removed from the receptacle. The transmitter 40 is also visible in FIG. 1.

The IR receiver 41 also comprises a colour sensor, the colour sensor comprising a light source and a sensing element. The light source is for illuminating the side of any pot present inside the receptacle, and the sensing element is for sensing the colour of the side of the pot based on the light from the light source, the light from the light source being reflected from the side of the pot and back to the sensing element. The colour information is reported via the wires 50. The colour sensor could be implemented separately from the IR receiver in alternate embodiments.

It will be appreciated that other types of pot sensor could alternatively be implemented, for example a pressure sensor at the base 22, optionally with a separate colour sensor for detecting the colour of the pot added to the receptacle.

The receptacle further comprises a heater element in the form of a heater mat 43 that is wrapped around the sidewalls 24. The heater mat 43 is powered by wires 53 and extends over substantially all of the outside surfaces of the sidewalls 24, leaving uncovered only the regions at the very tops and bottoms of the sidewalls 24 and the regions where the IR sensor and receiver are located. The heater mat is an electrical resistance mat that relies upon ohmic heating of electrical elements within the mat, but other types of heating mat could alternatively be used in other embodiments, for example inductive heating mats to induce electrical currents and heating in the sidewalls 24.

The base 22 of the receptacle is fitted with a metal plate 47 and a temperature sensor 45 on the metal plate 47. The metal plate 47 helps transfer heat from the base 22 to the temperature sensor 45. The metal plate 47 is connected to a grounding wire 57, which provides ground electrical potential to the base 22, sidewalls 24 and flange 26 of the receptacle for electrical safety. The temperature sensor is connected to wires 55 for reporting the temperature that is sensed by the temperature sensor.

The receptacle further comprises a layer of ceramic fibre material 48 that surrounds the base 22 and sidewalls 24, and which thermally insulates the heater mat 43 from the surrounding environment. The IR transmitter and receiver, and the temperature sensor, are surrounded by the ceramic fibre material 48, and the wires 50, 51, 53, 55, 57 pass through the ceramic fibre material 48. Other types of thermally insulative material could be used in place of the ceramic fibre material 48 in alternate embodiments if desired.

In this embodiment, the sidewalls 24 of each receptacle are defined by a single sheet of aluminium in a cylindrical shape that tapers along its length, but sidewalls defining other shapes are also possible in alternate embodiments, for example sidewalls defining shapes with square/rectangular cross-sections.

Figure 3:
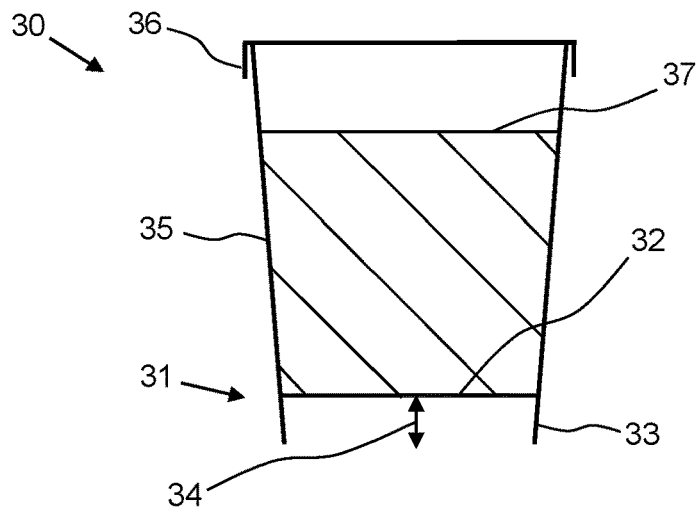
FIG. 3 shows a schematic cross-sectional diagram of a pot for fitting into the receptacle of FIG. 2.

The schematic diagram of FIG. 3 shows a side view of an example pot 30, such as the pot 30 shown placed in the receptacle in FIG. 1. The pot 30 has a base 31, sidewalls 35, and a lid 36. The pot is in the shape of a cylindrical cup that tapers along its length, and is sized to fit closely into the receptacle 20, so that the base 31 and sidewalls 35 of the pot contact the base 22 and sidewalls 24 of the receptacle. The pot 30 is shown filled with a soup 37, which is to be heated by placing the pot into one of the receptacles 20. Typically, the pot 30 is less than 30 cm in diameter, for example less than 15 cm in diameter, and holds a single serving of the soup 37. Clearly, other examples of the pot 30 may hold other types of food or beverage besides soup.

The lid 36 fits over the top of the sidewalls 35, at the opening into the pot 30, and the base 31 is at an opposite end of the sidewalls 35 from the lid 36. The base 31 comprises a floor 32 and a rim 33, the floor 32 defining the bottom of the space inside the pot where the soup 37 is held, and the rim 33 extending downwardly from the floor 32 to create an air gap 34 between the floor and the base of the receptacle when the pot is placed on a flat surface, such as the base 22 of the receptacle. The rim 33 is defined by a lowermost part of the sidewalls 35, opposite from the lid 36. The air gap 34 provides a buffer between the soup 37 and the temperature sensor 45 when the pot is in the receptacle, to help ensure that the full contents of the pot will be heated to the required temperature before that temperature is detected by the temperature sensor.

The outside surfaces of the sidewalls 35 are coloured red, to designate that the pot contents (soup) is to be heated to a high temperature such as 65° C. The red colouration may extend over some or all of the outside surfaces of the sidewalls 35, so that it will be exposed to the colour sensor of the IR receiver 40 when the pot 30 is placed in the receptacle 20. Other examples of the pot 30 may hold different contents and be coloured differently, for example a pot 30 holding baby milk may have the outside surfaces of the sidewalls 35 coloured yellow, to inform the receptacle that the pot contents only need to be heated to a medium temperature, for example 37° C. Users of the pots 30 can choose how hot an item of food or beverage is to be heated to by placing the item of food or beverage into an appropriately coloured pot, and then placing the pot into the receptacle.

Figure 4:
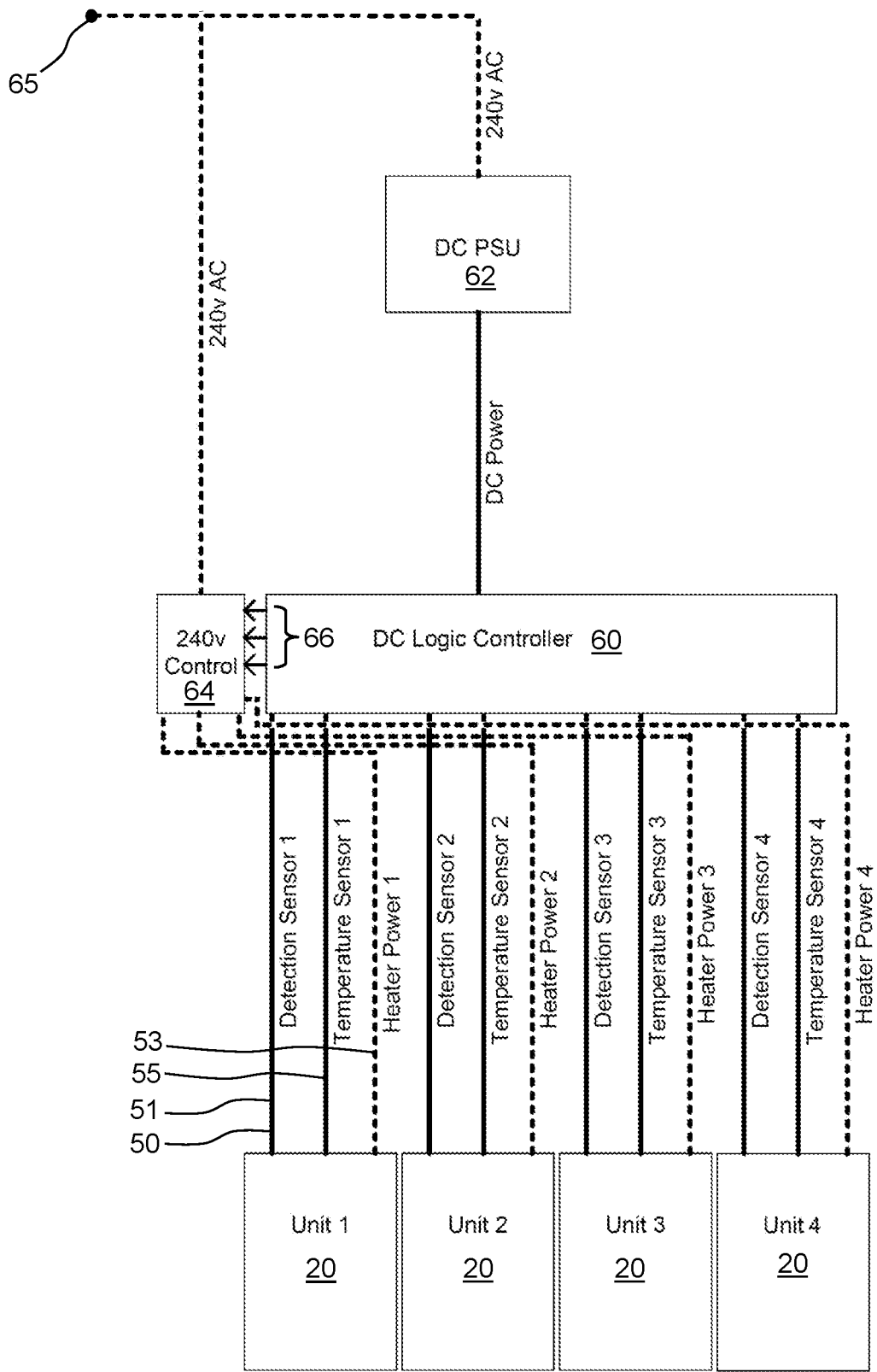
FIG. 4 shows a schematic block diagram of an electronic control system forming part of the pot heating apparatus of FIG. 1.

The schematic diagram of FIG. 4 shows an electronic control system. In this embodiment, three of these electronic control systems are incorporated into the housing of the pot heating apparatus 10 (see FIG. 1), each electronic control system corresponding to one of the platforms and for controlling the four receptacles 20 of that platform.

The control system comprises a mains power input 65 for receiving mains voltage alternating current (AC), a direct current power supply unit (DC PSU) 62, a DC logic controller 60, and a mains power switch 64. The DC power supply 62 receives the mains power from input 65, and converts it to 9V DC, for example. The output of the DC power supply 62 is connected to a power supply input of the DC logic controller 60. The DC power supply 62 may for example be a switched-mode power supply, and the DC logic controller 60 may for example be an Arduino (RTM) microcontroller.

The DC logic controller 60 is connected to the IR transmitters and receivers and the temperature sensors 45 of the four receptacles 20 of the platform that the electronic control system corresponds to. The IR transmitter and receiver of each receptacle are connected to the DC logic controller 60 via the wires 50 and 51, and the temperature sensor 45 of each receptacle is connected via the wires 55.

The mains power switch 64 comprises four relay switches and receives output(s) 66 from the DC logic controller 60 that control the four relay switches. Each relay switch is connected to the mains power input 65 and to the heater mat 43 of a respective one of the four receptacles 20, via the wires 53. The DC logic controller 60 therefore controls whether or not the heater mat 43 of each receptacle is connected to the mains power supply, to control when the receptacle performs heating.

The DC logic controller 60 forms part of a low power control section of the electronic control system, and the mains power switch 64 interfaces to mains voltage so the heater mats 43 can be powered by mains voltage yet controlled by the lower voltage DC logic controller 60, IR transmitter and receiver, and temperature sensor. This improves electrical safety, since if there is a malfunction of the IR transmitter, receiver, or temperature sensor that causes a short circuit to the aluminium cup, then only low voltage will be transmitted to the aluminium cup not mains voltage. The grounding of the aluminium cup via wire 57 also guards against any short-circuits that do occur.

Figure 5:
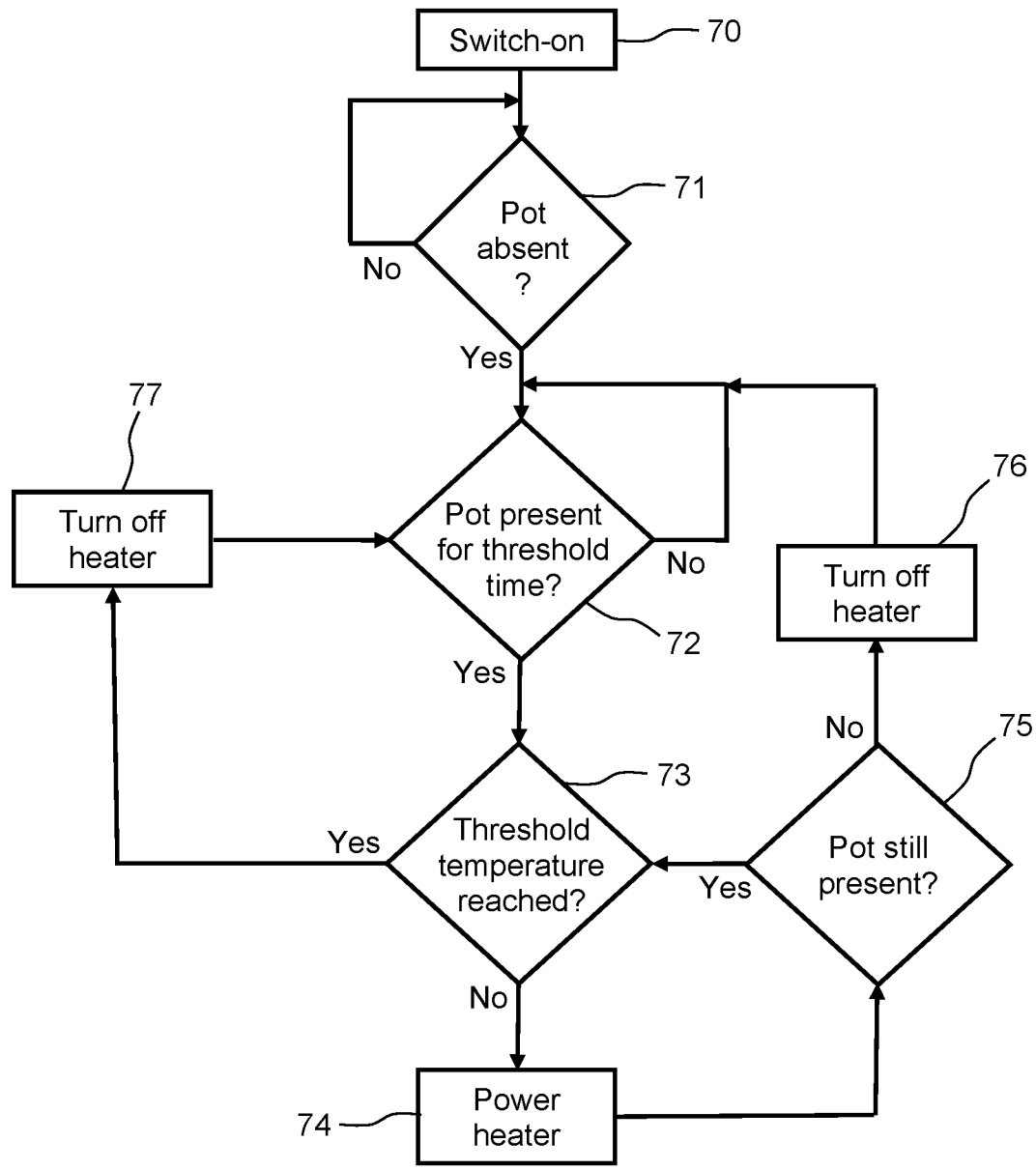
FIG. 5 shows a flow diagram of the use of the pot heating apparatus of FIG. 1.

The use of the pot heating apparatus 10 will now be described with reference to the flow diagram of FIG. 5. When mains power is first received at the input 65, for example via an ON switch of the pot heating apparatus 10, in a step 70, the outputs 66 are initialised to turn off all the relays of the mains power switch 64, so that no power is supplied to the heater mats 43. This is regardless of the inputs received at the DC logic controller 60 via the wires 50, 51 and 55.

Once the DC logic controller 60 has received an indication from the IR receiver 41 at step 71 that no pot is present in a particular receptacle 20, i.e. the IR light from the transmitter 40 is being received by the receiver 41, the DC logic controller 60 moves to a step 72. Until an indication that no pot is present has been received, the DC logic controller 60 keeps looping back to step 71. This prevents the receptacle from heating a pot that was already present in the receptacle when the pot heating apparatus 10 was first turned on.

At step 72, the DC logic controller 60 awaits an indication from the receiver 41 via the wires 51 that a pot is now present. The pot has to be present for more than a threshold period of time, in this example more than three seconds, before the DC logic controller 60 advances to the next step 73 where the temperature of the pot is checked. Therefore, a user temporarily placing a pot in the receptacle for less than three seconds will not cause the method to progress to step 73 and towards heating, saving energy. The DC logic controller 60 keeps looping back to step 72 until a pot is present for longer than the threshold period of time.

At step 73, the DC logic controller 60 checks the temperature reported by the temperature sensor 45, via the wires 55. If the pot is below a threshold temperature, then the DC logic controller 60 moves to step 74, where the DC logic controller uses output 66 to turn on the relay corresponding to the heater mat 43 of the receptacle 20, to heat the pot in the receptacle. The DC logic controller 60 keeps monitoring the temperature of the pot and heating the pot if the temperature is still too low and the pot is still present in the receptacle, by looping through steps 73, 74, and 75.

Once the threshold temperature is reached, the DC logic controller 60 moves to step 77, where the heater mat 43 is turned off, and then moves to step 72 and 73 to continue temperature monitoring if the pot is still in the receptacle.

The threshold temperature in step 73 may be predefined, or may be set according to a user input, for example according to the colour of the pot that is sensed by the colour sensor in the IR receiver 41.

Many other variations of the described embodiments falling within the scope of the invention will be apparent to those skilled in the art.

We claim:

1. An apparatus for heating a pot of food or beverage, the apparatus comprising at least one receptacle, each receptacle for temporarily receiving a pot of food or beverage to be heated, wherein each receptacle comprises:
   a base, sidewalls, and an opening opposite from the base for receiving the pot;
   a heater element mounted to the sidewalls, wherein the heater element is an electrical resistance heater element configured to produce heat by ohmic heating;
   a temperature sensor mounted to the base;
   a pot sensor for detecting whether or not a pot is present in the receptacle;
   a mains power input for receiving a mains voltage alternating current;
   a direct current power supply unit that is fed by the mains voltage alternating current,
   a controller connected to the heater element, temperature sensor, and pot sensor, the controller configured to control the heater element in response to the pot sensor and temperature sensor, wherein the controller comprises a mains voltage heater element switch that is switchable to supply the heater element with the mains voltage alternating current from the mains power input and a lower voltage control section that is powered by the direct current power supply unit and that is configured to control the mains voltage heater element switch in response to the pot sensor and the temperature sensor;
   wherein the heater element is configured to run at the voltage of the mains voltage alternating current and the pot sensor and the temperature sensor are configured to run at a lower voltage than the voltage of the mains voltage alternating current.

2. The apparatus of claim 1, wherein the controller is configured to only turn the heater element on whilst the pot sensor indicates a pot is present in the receptacle.

3. The apparatus of claim 1, wherein the controller is configured to only turn the heater element on after the pot sensor has continually indicated the presence of a pot for a threshold period of time of at least one second.

4. The apparatus of claim 1, wherein the controller is configured to keep the heater element turned off if the pot sensor indicates a pot is present when the controller is initially turned on, until after the controller has recorded an indication from the pot sensor that no pot is present.

5. The apparatus of claim 1, wherein the receptacle comprises a layer of thermal insulation wrapped around the sidewalls of the receptacle, the heater element being positioned between the sidewalls and the layer of thermal insulation.

6. The apparatus of claim 1, wherein the heater element is a heater mat that extends over at least 30% of the area of the sidewalls.

7. The apparatus of claim 1, wherein the base and sidewalls define a pot receiving space for receiving the pot, and wherein the pot sensor is recessed into the base or sidewalls and so does not protrude into the pot receiving space.

8. The apparatus of claim 1, wherein the pot sensor comprises an infra-red sensor or a pressure sensor.

9. The apparatus of claim 1, wherein the receptacle comprises a metal cup that forms inside surfaces of the receptacle for touching the pot, the metal cup forming the base, sidewalls, and opening of the receptacle.

10. The apparatus of claim 1, wherein the apparatus comprises a housing having a platform for supporting the at least one receptacle, wherein the platform comprises at least one hole in which the at least one receptacle are respectively mounted, wherein each receptacle comprises a flange surrounding the opening of the receptacle for securing the receptacle to the platform.

11. The apparatus of claim 10, wherein the housing further comprises a cover plate having apertures that align with the openings of the at least one receptacle, wherein the flange of each receptacle is positioned between the platform and the cover plate.

12. The apparatus of claim 11, wherein the receptacle comprises a metal cup that forms inside surfaces of the receptacle for touching the pot, the metal cup forming the base, sidewalls, and opening of the receptacle, wherein the flange is part of the metal cup, and wherein the cover plate is formed of a thermally insulative material.

13. The apparatus of claim 1, wherein the controller is configured to turn on the heater element until the temperature sensor indicates that a desired temperature has been reached.

14. The apparatus of claim 1, wherein the heater element is an electrical resistance heater element.

15. The apparatus of claim 1, wherein the pot sensor comprises a colour sensor for sensing a colour of the pot, and wherein the controller is configured to control the heater element to heat the pot to a temperature that is selected based on the sensed colour of the pot.

16. The apparatus of claim 1, further comprising a plurality of pots for holding food or beverage to be heated, wherein each pot is sized to fit closely into the receptacle for effective heat transfer.

17. The apparatus of claim 16, wherein each pot comprises a base having a floor and a rim, the floor defining a bottom of a space inside the pot for receiving food or beverage, and the rim extending downwardly from the floor to create an air gap between the floor and the base of the receptacle when the pot is fitted into the receptacle, and wherein the temperature sensor is located beneath the air gap.

18. The apparatus of claim 16, wherein the pot sensor comprises a colour sensor for sensing a colour of the pot, and wherein the controller is configured to control the heater element to heat the pot to a temperature that is selected based on the sensed colour of the pot, wherein each pot comprises a coloured region having a colour corresponding to a temperature to which the food or beverage content of the pot is to be heated to.

19. The apparatus of claim 1, wherein each receptacle is sized to closely receive a pot of less than 30 cm diameter.

* * * * *